United States Patent

[15] 3,648,026

Abe et al.

[45] Mar. 7, 1972

[54] DATA MONITORING SYSTEM

[72] Inventors: Fujio Abe, Wake Forest; Clifford R. Crawford, St. Pauls, both of N.C.

[73] Assignee: Burlington Industries, Inc., Greensboro, N.C.

[22] Filed: Nov. 18, 1969

[21] Appl. No.: 877,674

[52] U.S. Cl. ................ 235/92 PD, 235/92 ST, 235/92 R, 242/28, 242/36
[51] Int. Cl. ................................ G06m 3/12, B65h 69/04
[58] Field of Search ....... 226/100, 11; 242/28, 36, 35.5–35.6; 235/92, 27, 3, 27.1, 29 D, 31, 63, 59, 73

[56] References Cited

UNITED STATES PATENTS

| | | | |
|---|---|---|---|
| 2,736,505 | 2/1956 | Furst et al. | 242/36 |
| 2,752,103 | 6/1956 | Furst | 242/36 |
| 3,124,316 | 3/1964 | O'Brien et al. | 235/92 PD |
| 3,301,647 | 1/1967 | Shafer | 235/92 PD |
| 3,458,912 | 8/1969 | Werffeli | 242/35.6 |
| 3,491,961 | 1/1970 | Jenny | 242/35.5 |
| 3,003,691 | 10/1961 | Strandberg | 235/92 ST |

*Primary Examiner*—Maynard R. Wilbur
*Assistant Examiner*—Joseph M. Thesz, Jr.
*Attorney*—Cushman, Darby & Cushman

[57] ABSTRACT

A data monitoring system for use with yarn winders and the like including a yarn-break accumulator which measures and accumulates the number of yarn-breaks which occur for each bobbin-cone combination of the winder. An indicator or red-light accumulator is provided for measuring and accumulating the number of red lights which occur as a result of the failure of the winder to successfully tie together broken strands of yarn. An efficiency monitor is provided in combination with the yarn-break accumulator and the red-light accumulator and a slub accumulator is also provided. A rejected bobbin accumulator system is provided to detect and count the number of bobbins which are rejected having residue yarn thereon. A bad knot accumulator provides an accumulated count of the number of bad knots which occur for each individual bobbin-cone combination and a scanning system is provided in conjunction with the efficiency monitor whereby a plurality of bobbin-cone combinations or spindles can be scanned over a predetermined time period whereby the efficiency of these bobbin-cone combinations in operation can be determined.

23 Claims, 8 Drawing Figures

Patented March 7, 1972 3,648,026

INVENTORS
FUJIO ABE
CLIFFORD R. CRAWFORD

BY *Cushman, Darby & Cushman*
ATTORNEYS

INVENTORS
FUJIO ABE
CLIFFORD R. CRAWFORD

DATA MONITORING SYSTEM

The present invention relates to monitoring systems and more particularly to monitoring systems for use with yarn winders whereby information with respect to machine performance can be gathered and provided for the use of supervisory personnel for the optimization of machine and manpower utilization. The present invention monitors and totalizes the performance of each bobbin-cone or spindle unit in an effort to pinpoint mechanical malfunctions, operator ineffectiveness and defective yarn running conditions and provides the maintenance and supervisory staff with valuable process information.

With the introduction of high-speed automated textile machinery, management and supervisory personnel require accurate and reliable machine-monitoring systems for the optimization of machine and manpower utilization. The present invention fulfills the need for such monitoring systems and provides management and supervisory personnel with total performance information for each 10 bobbin-cone or spindle unit in a yarn winder.

Thus, the general purpose of this invention is to provide a series of monitoring systems which gather information for management and supervisory personnel and which provide a powerful tool for effective control over manpower and machinery.

An object of the present invention is the provision of a monitoring system which totalizes the performance of each spindle unit in a winder to enable management to pinpoint mechanical malfunctions, operator ineffectiveness and defective-yarn running conditions.

Another object is to provide an invention which enables the attachment of signal-conditioning circuits directly to the internal electrical wiring of each spindle unit thereby reducing the number of external sensors, switches and cams required in the generation of counter-driving impulses.

Other objects and features of the invention will become apparent to those of ordinary skill in the art as the disclosure is made in the following description of a preferred embodiment of the invention as illustrated in the accompanying sheets of drawings in which:

Because the winding process is one of the final stages during yarn manufacture, it serves as a convenient inspection point for determining the quality of yarn produced. The winding process involves the transfer of yarn wound on spinning bobbins to cones and each cone consists of a continuous length of yarn which has been transferred from a number of spinning bobbins. As a result, a series of splices are required between the tailing end of the yarn on one bobbin and the leading end of the yarn on another bobbin.

Figure 1:
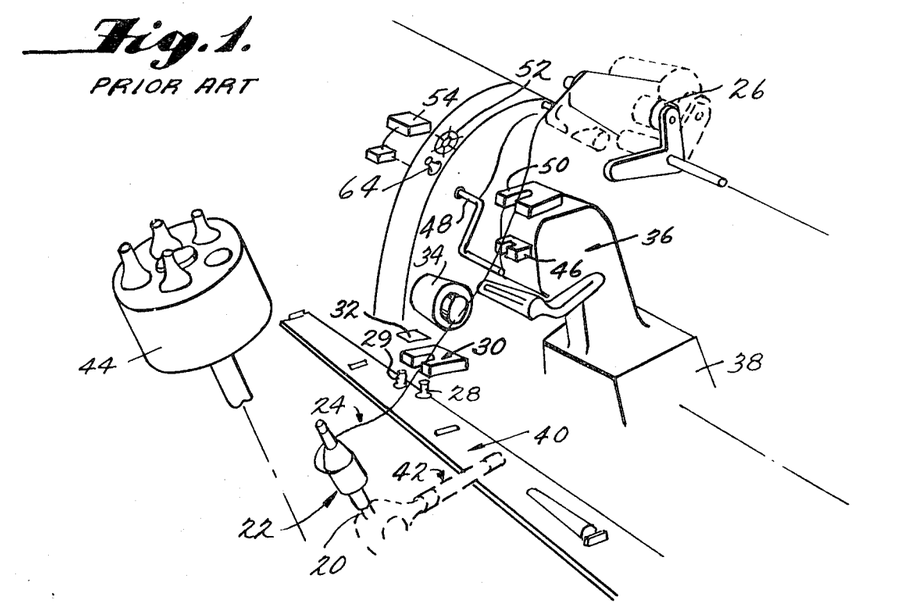
FIG. 1 is a partial perspective view of a known basic winder spindle.

A basic winding frame or winder spindle exemplary of those known in the art is shown in FIG. 1 and includes a stationary shaft 20 which maintains a bobbin 22 in an upright position to facilitate the transfer of yarn 24 onto the positively driven cone spindle 26. Other elements are used in the winder spindle and these include the tension discs 28 and 29, the slub detector 30, the slub knife 32 and tension motor 34 which together with tension discs 28 and 29 maintain sufficient drag on the yarn 24 to prevent backlash and tangles. The tension discs and the tension motor also act to purposely break weak sections of the yarn. The slub detector 30 inspects the yarn for thickness or density variations and actuates the knife 32 when defective yarn is sensed. Slub-detector sensing elements employ either electrostatic (capacitive), optical (photocell) or mechanical (gauge) means for its operation.

The Schlafhorst autoconer winder (as an example of those known in the art) is of European design and was introduced into the American textile industry in an effort to automate the winding process. Each of these winders is equipped with 50 automatic spindles composed of five groups of 10 spindle sections. An automatic knot-tying mechanism 36 traverses the length of each 10 spindle section and performs operations previously done manually. This mechanism is known as the knotter. The knotter is fully automatic and moves on a carriage 38. The knotter pauses at each of the unproductive spindles to perform the required corrective action. A built-in trip mechanism ejects the spent bobbin 22 and replenishes the spindle with a full bobbin. The knot-tying mechanism automatically splices the leading end of the full bobbin to the tail end of the spent bobbin and provides a continuous yarn to the cone 26. The ejected bobbin then falls onto a belt conveyor 40 to be collected at a central collection point.

The knotter 36 in FIG. 1 is shown in the servicing position and provides the motivating force to eject the spent bobbin 42 onto an empty-bobbin conveyor 40. A full bobbin 22 is then fed from the bobbin magazine 44 into position on the stationary shaft 20. The knotter head assembly 46 splices both ends of the yarn 24 together and after completing a splice, the spindle restarts and continues to run until the yarn feeler 48 detects a broken yarn. The spindle also becomes unproductive when the cone 26 has been wound to full capacity and the full-cone position is shown dotted in FIG. 1.

A yarn-irregularity detector called the knot tester 50 is mounted on the knotter assembly 46 to detect and sever any "long-tailed" or untrimmed knots. In addition, an operator warning or indicator light 52 commonly called the "red light" is illuminated when the yarn feeler 48 is consecutively activated following a series of unsuccessful tying attempts by the knotter. The electronic failure control unit 54 is electrically coupled to the yarn feeler 48 and is programmed to disengage the spindle unit following a predetermined series of unsuccessful tying attempts by the knotter. Once this "red-light" condition occurs, the knotter makes no attempt to service the spindle and bypasses it on successive passes. Until the winder attendant performs the corrective action the spindle remains disengaged and unproductive.

The winder attendant performs a number of tasks essential to the operation of the winder. He replenishes each bobbin magazine 44, corrects tangled-yarn conditions, removes slaughs off bobbins, doffs full cones, and performs other corrective tasks to ensure uninterrupted running conditions. Productivity and maximum utilization of the automatic winder depends to a great extent upon the effectiveness of the operator in performing his assigned tasks.

Figure 2:
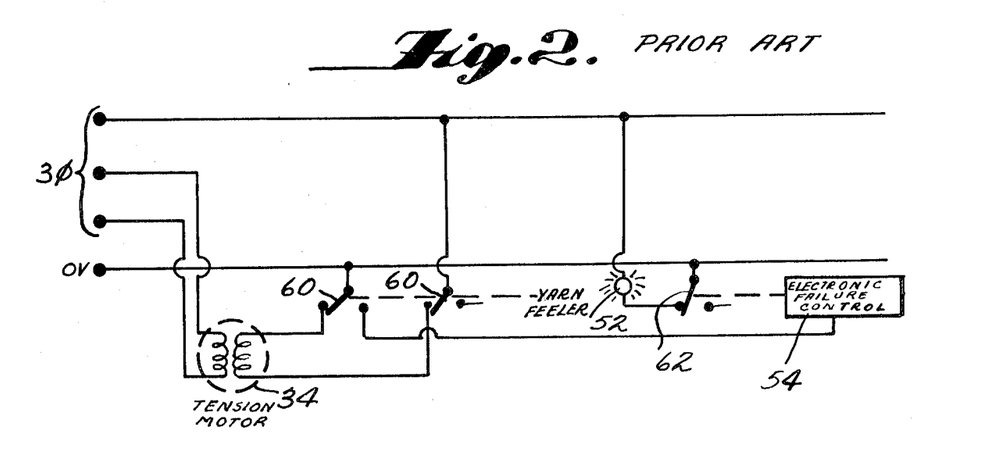
FIG. 2 is a schematic illustration of a known spindle electrical circuit.

FIG. 2 shows a simplified schematic diagram of a known spindle electrical circuit. The switch 60 is mechanically coupled to the yarn feeler 48 and controls the activities of the tension motor 34 as well as the electronic failure control unit 54. During the normal course of operation, the switch 60 applies power to the tension motor 34 and remains in this position until a yarn break occurs. When a yarn break does occur, switch 60 transfers and disconnects the tension motor 34. The switch 60 remains in this position until the yarn feeler 48 returns to its normal operating condition. The switch 60 also serves as a means for providing energy to the electronic failure control 54. This control is programmed in a known manner to mechanically disengage the spindle unit following a series of unsuccessful retying attempts and activates a solenoid plunger, which in turn, transfers switch 62. The switch 62 energizes the red light 52 and remains in this position until the operator corrects the fault and resets the red-light reset button 64 (FIG. 1).

Figure 3:
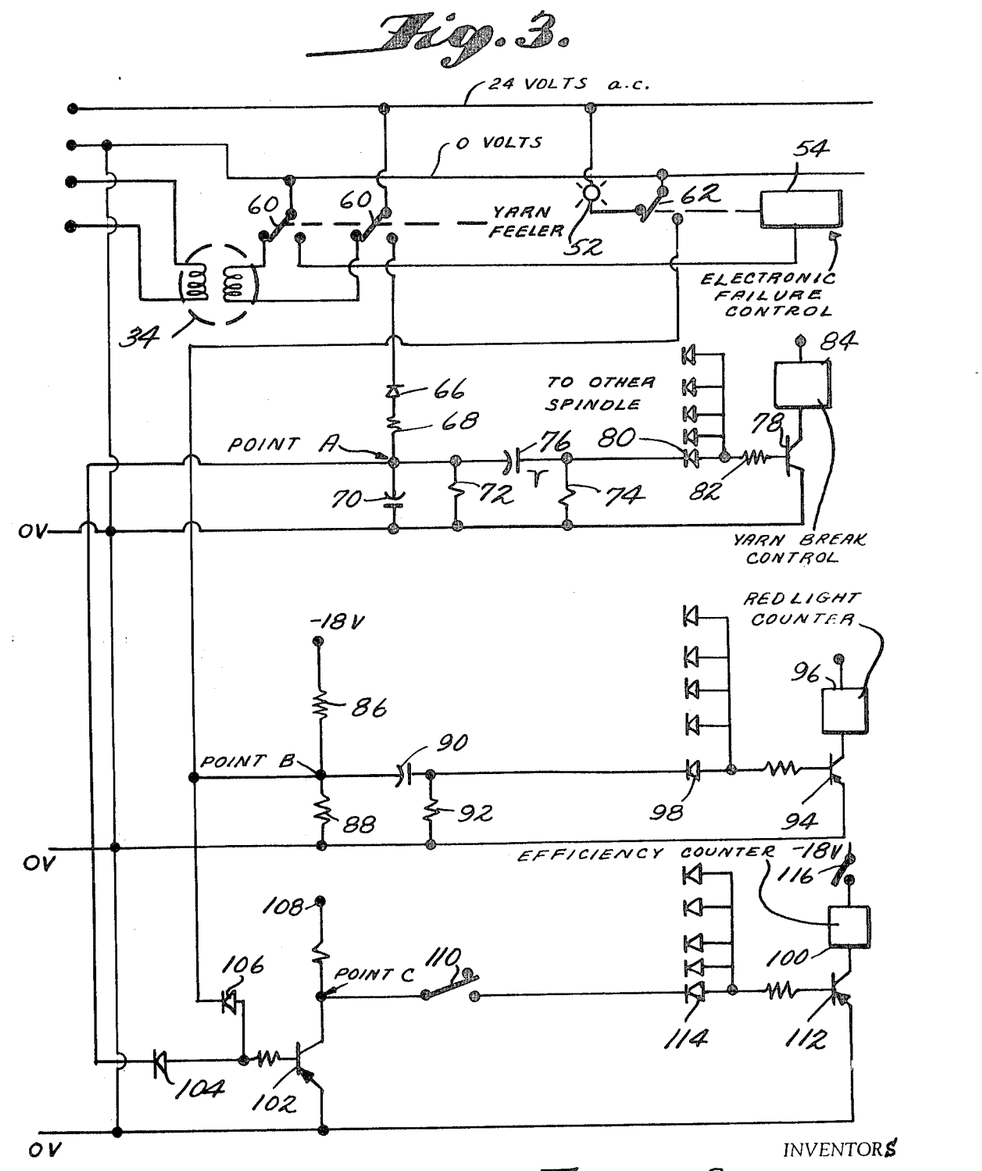
FIG. 3 is a schematic diagram of certain embodiments of this invention together with the circuit of FIG. 2.

FIG. 3 shows the yarn-break accumulator, the red-light accumulator and the efficiency monitor of this invention. Although each of these systems is illustrated in combination it should be understood that the yarn-break accumulator and the red-light accumulator may be used individually and without the presence of the other. However, the efficiency monitor is preferably used in combination with both the yarn-break accumulator and the red-light accumulator.

The yarn-break accumulator derives its input from the yarn feeler switch 60 and when a yarn break occurs, the switch 60 transfers the AC source from the tension motor 34 to the diode 66. This diode rectifies the incoming AC and provides a rectified AC signal to the filter network including the resistor 68 and capacitor 70. This filtered negative DC voltage is applied to the pulse-forming network including resistors 72 and 74 and capacitor 76. Capacitor 76 and resistor 74, being a differentiating network, generate a narrow negative-going pulse when switch 60 transfers and transistor 78, preferably being common to the outputs of ten spindle yarn-break networks, accumulates the resulting yarn breaks that occur within each section while diode 80 isolates and prevents interaction between adjacent spindles. The base resistor 82 of the yarn-break driver transistor 78 provides the proper counter driving circuit for the yarn-break counter 84.

The red-light accumulator system illustrated in FIG. 3 derives its driving power from the pulse forming network connected to the red-light switch 62. Following a series of unsuccessful knot-tying attempts, the electronic failure control 54 activates a solenoid (not shown) and transfers switch 62 to the "on" red light position. Series resistors 86 and 88, being a voltage divider network, divide the −18 volts, for example, applied thereacross. During normal spindle operation switch 62 maintains point B at zero potential but when switch 62 transfers to the "on" red light position, a voltage develops across resistor 88 and across the differentiating network comprising capacitor 90 and resistor 92. The pulse derived from this network drives the red-light counter transistor 94 and the red-light counter 96. The isolation diode 98 prevents interaction between similar networks of adjacent spindles. The transistor 94, being common to all 10 similar networks, accumulates the red-light activity for the 10 spindle section as does the red-light counter 96.

Figure 4:
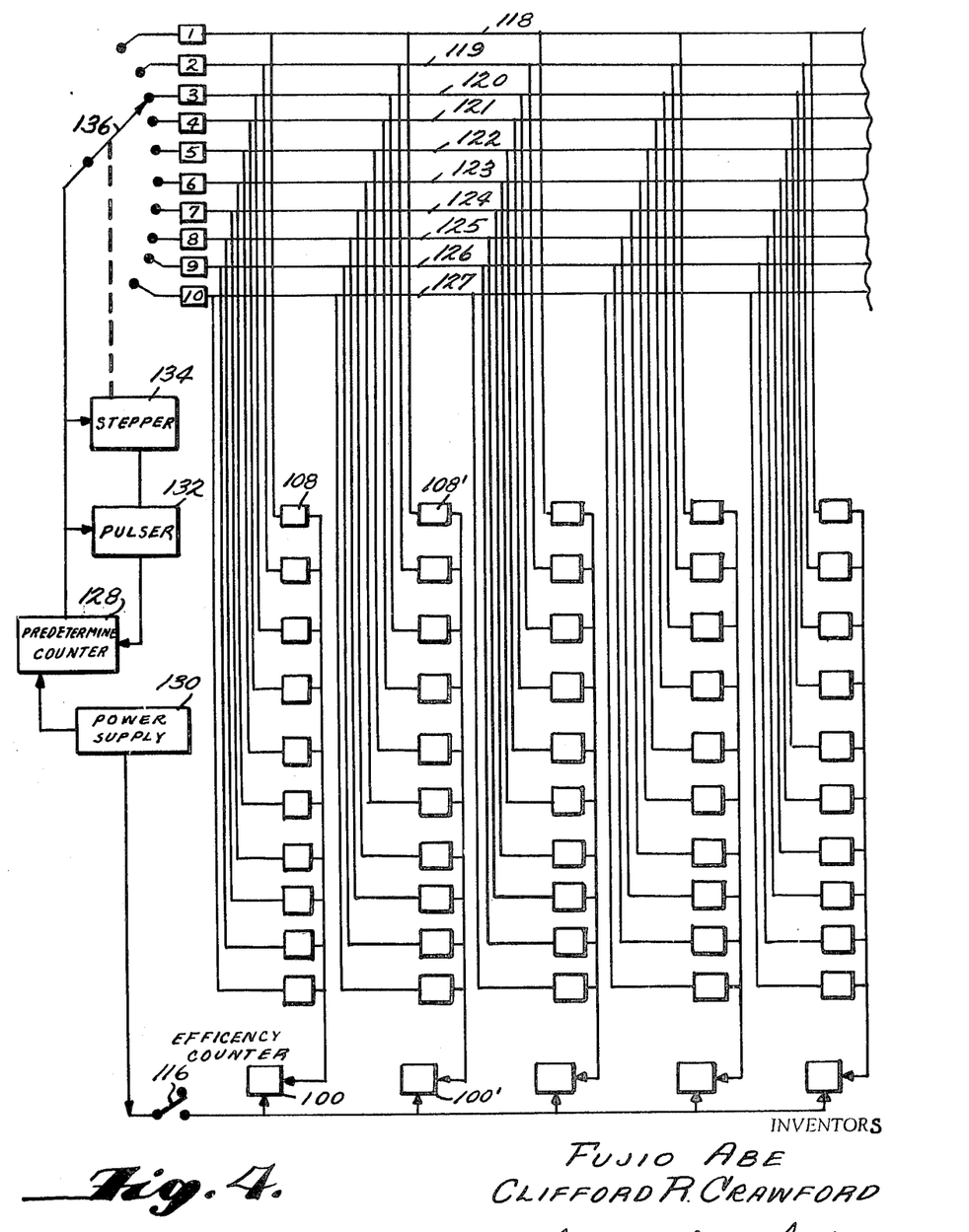
FIG. 4 is a simplified block diagram of the efficiency monitoring system and scanning arrangement.
Figure 5:
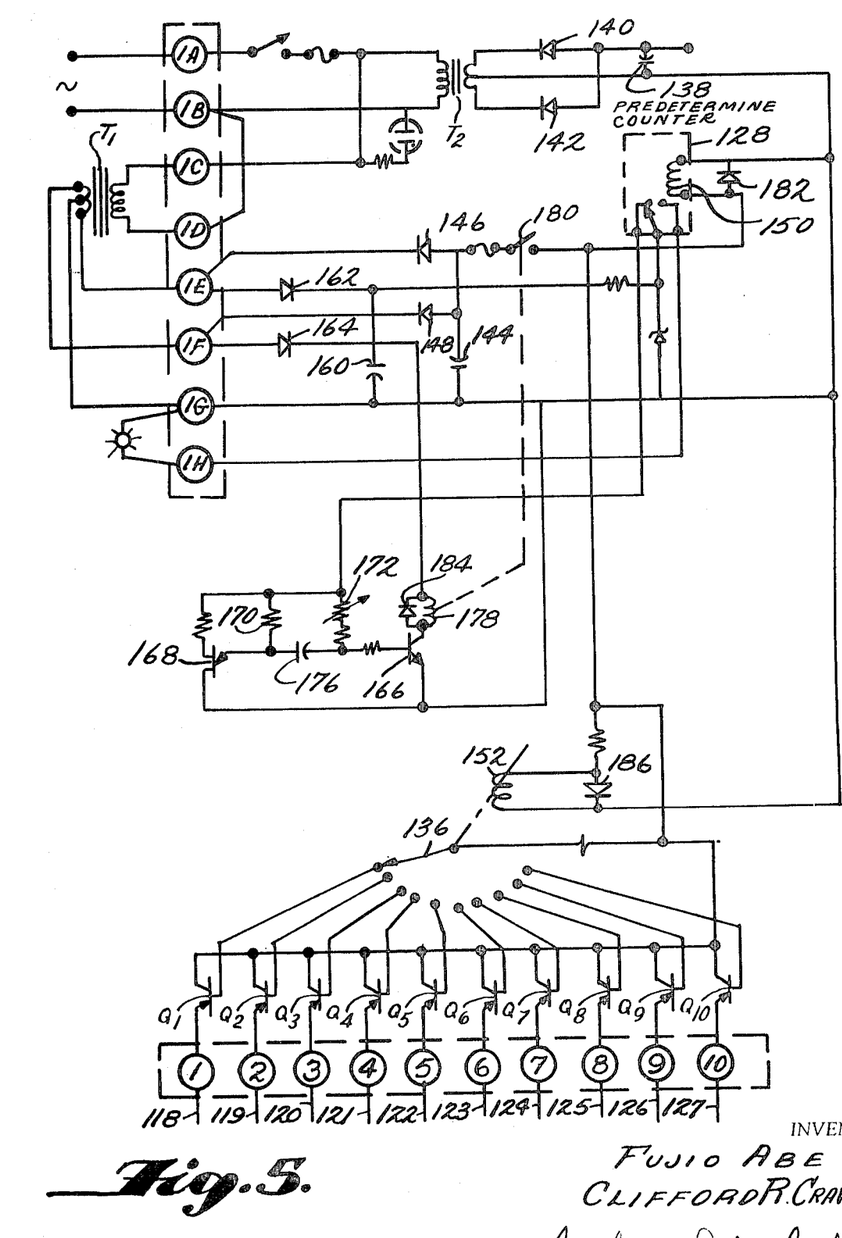
FIG. 5 is a schematic diagram of the power supply and scanning arrangement of this invention.

The spindle efficiency monitor determines the running efficiency of the 10 spindle section. A master 10 position stepping switch, as illustrated in FIGS. 4 and 5, polls each spindle sequentially for active spindles and each spindle when polled responds with either an output signal for an operating spindle or the absence of a signal for an idle spindle. This sequential sampling continues until the programmed number of samples have been taken, the sampling being done in sets of 100, 1,000 or 10,000, for example. At the end of this sampling period the counter 100 displays the total active spindles which represents the percent running efficiency during the recorded period. As an example, a total of 856 counts recorded at the end of 1,000 samples represents a running efficiency of 85.6 percent.

Unproductive spindles are attributed to yarn breaks, red lights and cones wound to capacity. The inverter circuit employing transistor 102 serves as a condition detector or sampling gate and diodes 104 and 106 provide an OR input to the inverter base circuit. These diodes are connected to the yarn-break circuit at point A and to the red-light circuit at point B, respectively. Either a yarn-break or a red-light occurrence causes the base current to flow in transistor 102. This base-current flow saturates the transistor 102 and causes collector point C to drop to zero potential. Sampling is accomplished by sequentially applying a −18 volt pulse, for example, to each of the sampling points, e.g., terminal 108. An operating spindle produces an output at point C by nature of the nonconducting transistor 102 while a nonoperating spindle does not produce an output at point C.

The switch 110 operates as a full cam detector and is located in series with point C and the input of the efficiency counter driver transistor 112 is preferably a mercury switch installed on the full-cone trip mechanism. The switch 110 remains closed during cone build-up and opens only after the cone diameter meets the required size. Again, isolation diode 114 is provided to prevent interaction between similar networks of adjacent spindles and the machine-run switch 116 can be placed in circuit with the efficiency counter 100 so that no efficiency count will be registered as long as the spindle is not in operation.

FIG. 4 illustrates a simplified block diagram of the centralized scanning system which is utilized in conjunction with the efficiency monitoring system to enable each respective efficiency counter 100 to measure the efficiency of a group of 10 spindles. A master 10 position scanning array provides the sampling pulses for the entire system of five sections having 10 spindles in each section. All sampling points on spindles No. 1, e.g., terminals 108, 108' etc., are commonly driven by scanner bus 118, and in a similar manner, all other sampling points are driven by a respective scanner bus 119–127. The master scanner continually samples each of the 10-spindle positions and repeats its sequence until the programmed number of samplings have been taken. The predetermining counter 128 stops the sampling sequence following a total of 100, 1,000 or 10,000 samplings, for example, and the totalized counts displayed on the efficiency counter 100, 100', etc., at the end of this count period represent the running efficiency for each section. At the end of this display period the predetermined and efficiency counters may be manually reset to begin another cycle.

The power supply 130 is coupled to the predetermining counter, which in turn, is coupled to pulser 132 and to stepper 134. The pulses produced by the pulser 132 are fed to the predetermining counter 128 and to the stepper 134 so that the movable contact 136 is sequentially stepped with respect to the busses 118–127.

FIG. 5 is a schematic diagram of the central power supply and master scanner. This unit provides the scanning pulses and power to the entire monitoring system. Transformer $T_2$ supplies power to the output filter capacitor 138 through full wave rectifiers 140 and 142. The resulting output voltage supplies the counters of the various accumulator systems and the −18 volt terminals in each of the spindle units. Transformer $T_1$ supplies power to filter capacitor 144 through full-wave rectifiers 146 and 148 and this rectified output supplies power to the predetermining counter coil 150, stepper relay coil 152 and the sampling busses as they are sequentially energized. Transformer $T_1$ also supplies filter capacitor 160 through full-wave rectifiers 162 and 164 with the output across capacitor 160 being a positive 18 volts, for example, which provides power to the timing oscillator and to the scanner output transistor 166.

The timing oscillator circuit illustrated in FIG. 5 includes a unijunction transistor 168 coupled to the timing R–C network which includes resistors 170, 172, and 174 as well as capacitor 176. Variable resistor 172 controls the rate of timing and the output of the oscillator drives output transistor 166. The relay coil 178 is the output load of transistor 166 and provides driving impulses simultaneously to the predetermined count coil 150 and to the stepping relay coil 152. The duration of the closure of relay contacts 180 determines the length of the sampling pulse and the scanner gating transistors $Q_1$–$Q_{10}$ provide the output to the scanner busses 118–127, respectively. The gating transistors extend the life of the stepping-switch contacts by allowing the base current of low magnitude to flow through the respective-switch contacts while the greater sampling current flows through the transistor emitter-collector paths. Diodes 182, 184 and 186 serve as protective devices to suppress inductive "kicks" that may develop across their respective coils.

Figure 6:
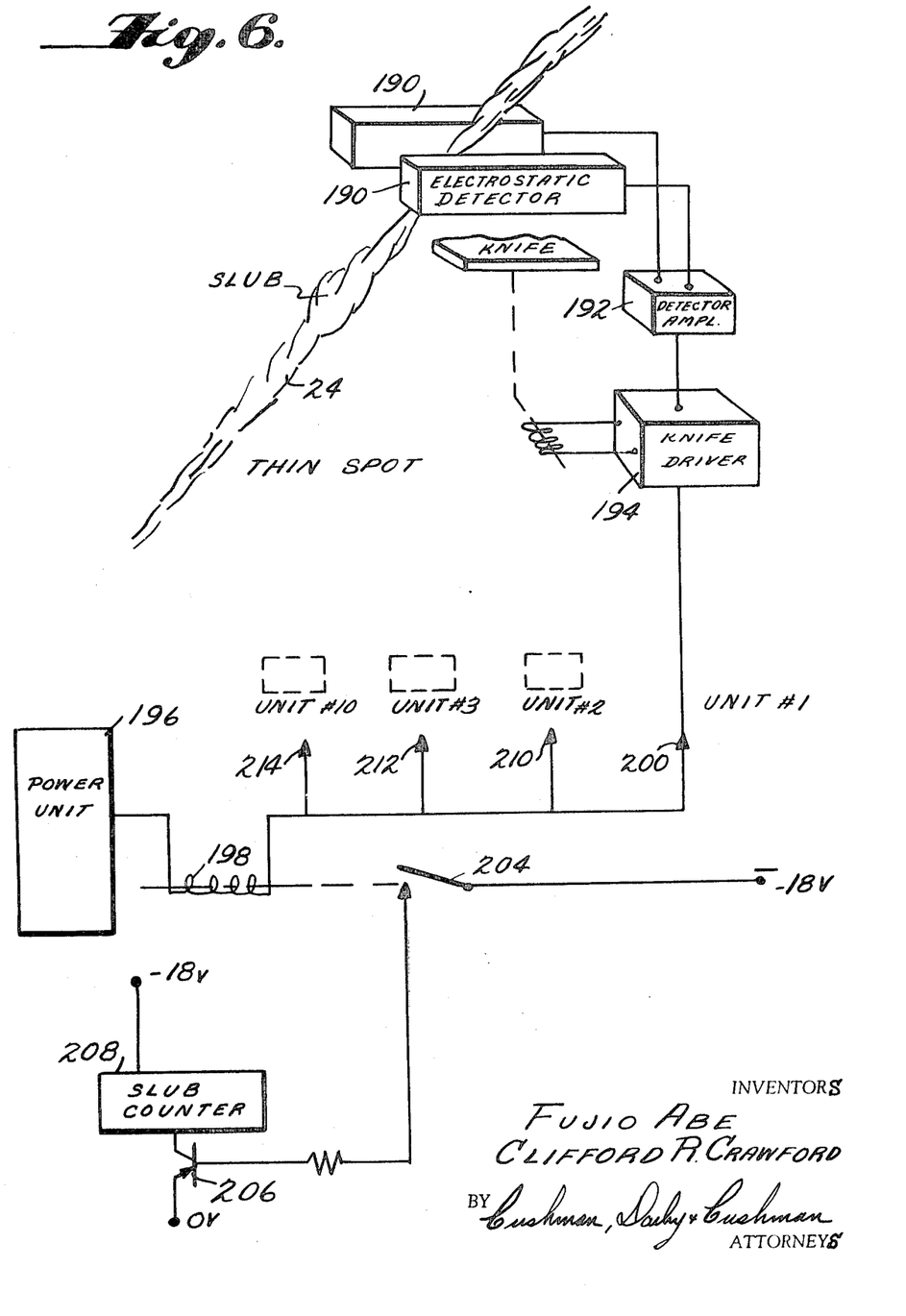
FIG. 6 is a diagrammatic view of the slub accumulator system of this invention.

FIG. 6 illustrates the slub accumulator system of this invention. Each bobbin-cone combination or spindle unit includes a known electrostatic detector which detects the presence of slubs or thin spots in the yarn 24 as the yarn passes through the detector 30. The detector is coupled to a detector amplifier 192 the output of which is coupled to a knife driver circuit and knife solenoid 194. A power unit 196 is coupled through a relay coil 198 and through an isolation diode 200 to the knife driver and knife solenoid 194. When a slub or thin spot is detected by detector 30 the circuit is activated and a pulse is produced so that the knife solenoid causes the knife 32 to be activated to cut the yarn 24 and to eliminate the slub or thin spot. Simultaneously, the pulse produced in the circuit activates the relay coil 198 to close relay contact 204. This causes transistor 206 to conduct and a pulse input is provided to the slub counter 208. In this way the presence of slubs or irregularities in the yarn 24 are counted and accumulated in the slub counter 208. A series of additional isolation diodes 210, 212, 214 etc., are provided to prevent interaction between the various spindles.

Figure 7:
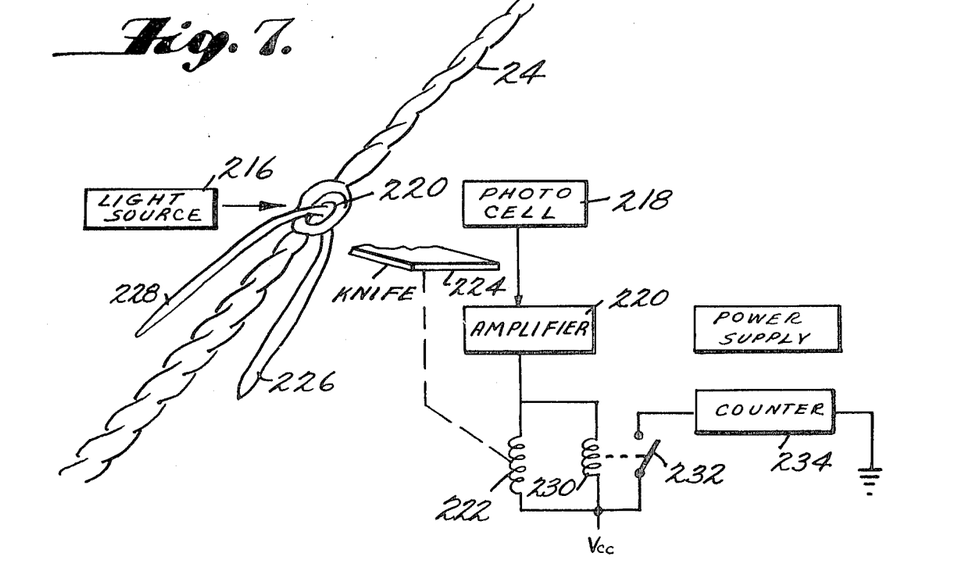
FIG. 7 is a diagrammatic view of the bad knot accumulator system.

FIG. 7 illustrates the bad knot count accumulator system of this invention. A conventional knot detector 50 (FIG. 1) such as a light source 216 and a photocell 218, for example, is used to detect the presence of badly tied knots 220. The presence of a badly tied knot causes a current to flow through amplifier 220 and through the knife solenoid 222 so that the knife 224 is activated to sever the surplus leads 226 and 228 of the knot. A sensitive relay coil 230 is electrically connected across the knife solenoid 222 and causes the contact 232 to be closed and the counter 234 to be actuated when a bad knot is detected and when the knife 224 is activated to trim the knot. The coil 230 has a resistance of 2,000 ohms, for example, and draws a negligible current from the knot tester circuit and from the knife solenoid 222.

Figure 8:
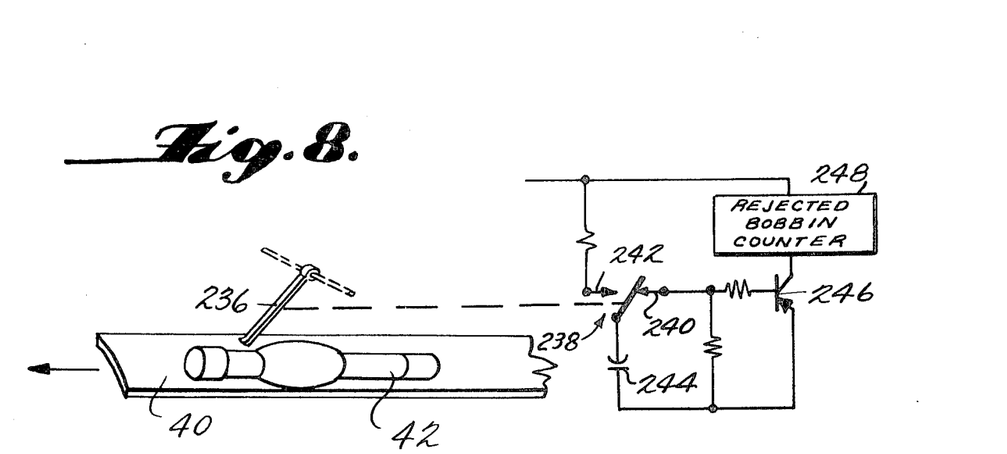
FIG. 8 is a schematic of the rejected bobbin accumulator system of this invention.

FIG. 8 illustrates the rejected bobbin accumulator system of this invention. The rejected bobbin accumulator system serves to highlight sections that have a spindle or spindles with misadjusted eject mechanisms or bobbin magazines supplied with improperly wound spinning bobbins. A bobbin yarn feeler 236 is mounted to contact rejected bobbins 42 which have residue yarn thereon and the feeler is also mechanically linked to the bobbin yarn switch 238. The feeler 236 and the switch 238 are normally oriented in a first position, as illustrated in FIG. 8. When a bobbin having residue yarn thereon passes adjacent to the feeler 236 the feeler contacts the residue yarn and moves from the first position to a second position. This movement also causes corresponding movement of the bobbin switch 238 from terminal 240 to terminal 242 which provides a charge path for capacitor 244. After the bobbin 42 passes beyond the feeler 236 the feeler and the switch 238 return to their normal position and the switch 238 again contacts terminal 240. The capacitor 244 then discharges through the transistor 246 which drives the rejected bobbin counter 248 and causes the counter to register the presence of a bobbin 42 which has residue yarn thereon.

This invention provides a powerful tool for the effective control over manpower and machinery. Information gathered by means of this invention enables management to analyze trends, highlight problem areas, implement corrective measures and to follow up on the results of corrective action. The various portions of this invention can be readily interfaced with computers to provide important information desired by management with respect to the operation of machinery and the effectiveness of manpower.

Obviously many modifications and variations of the present invention are possible in light of the above teachings. It is therefore to be understood that within the scope of the appended claims the invention may be practiced otherwise than as specifically described.

What is claimed is:

1. For use in combination with a winder and with a spindle electrical circuit associated therewith having electrical inputs, an electrical tension motor in circuit therewith, a first switch in circuit with said motor, an indicator in circuit with at least one of said inputs and a second switch in circuit with said indicator, a yarn-break accumulator system and an indicator accumulator system comprising:

rectifier means for connection in circuit with said first switch and for providing a rectified signal;

filter means in circuit with said rectifier means for providing a filtered DC voltage;

pulse forming means in circuit with said filter means for providing narrow output pulses;

first amplifier means in circuit with said pulse forming means for amplifying said output pulses;

first counter means in circuit with said amplifier means for counting the number of yarn breaks which occur, a voltage divider having a central terminal for connection in circuit with said second switch;

a pulse-forming network in circuit with said voltage divider;

second amplifier means in circuit with said pulse-forming network for amplifying the pulses from said network;

second counter means in circuit with said amplifier means for counting the number of times said indicator is energized, and further in combination with an efficiency sampling gate means in circuit with said rectifier means and with said second switch;

a scanner terminal in circuit with said gate means;

a third switch in circuit with said gate means;

third amplifier means in circuit with said third switch; and a third counter in circuit with said amplifier means for indicating the efficiency of operation of said winder.

2. A combination as in claim 1 further including a third isolation diode in circuit between said third switch and said third amplifying means.

3. A combination as in claim 2 wherein said sampling gate means includes:

an OR-circuit having inputs in circuit with said second switch and with said rectifier means; and an inverter circuit coupled to the output of said OR circuit.

4. A combination as in claim 3 further including a machine-run switch in circuit with said third counter for preventing actuation of said third counter when said machine-run switch is open.

5. A combination as in claim 2 including a like plurality of said yarn-break accumulator systems, said indicator accumulator system and said efficiency monitor systems and further including:

a power supply;

predetermined counter means in circuit with said power supply for determining the total number of samplings;

pulser means in circuit with said predetermined counter means for providing pulses in response to an output from said predetermined counter means; and stepper means in circuit with said pulser means and said predetermined counter means for sequentially electrically coupling said power supply to predetermined groups of said scanner terminals.

6. A process monitoring system for monitoring the operations of a yarn winding machine comprising a plurality of bobbin-cone stations for winding yarn from a bobbin onto a cone, said machine also including an automatic knot tier for connecting loose ends of yarn, and, at each station thereof, a yarn break detector, a bad knot detector and a failure detector connected to the bad knot detector for sensing a predetermined number of successive bad knots, said monitoring system comprising:

a full cone detector at each of said stations for sensing when said cone if filled with yarn, a condition detector means at each of said stations connected to its respectively associated said yarn break detector, to said full cone detector and to said failure detector for sensing the operating condition of its associated station by providing a first output condition to indicate a nonoperating condition when either said yarn break detector, said full cone detector or said failure detector has been activated and a second output condition to indicate an operating condition when neither said yarn break detector, said full cone detector nor said failure detector have been activated, stationary electronic scanning means operatively connected to a plurality of said stations, for successively and repetitively interrogating a respectively corresponding plurality of said condition detector means and for recording and accumulating at least one of the instantaneous conditions thereof, and predetermine counter means for automatically terminating the interrogation after a predetermined number of scanning cycles to thereby provide a direct efficiency indication after said predetermined number of scanning cycles by counting and accumulating the percentage of successful station operating time during a predetermined time period during which each station's condition is successively and repetitively sampled said predetermined number of times.

7. A process monitoring system as in claim 6 further comprising:

a failure accumulator operatively connected to said yarn break detectors at a plurality of stations for counting and indicating the total number of detected failures.

8. A process monitoring system as in claim 6 further comprising a yarn-break accumulator operatively connected to said yarn break detectors at a plurality of stations for counting and indicating the total number of detected yarn breaks.

9. A process monitoring system as in claim 6 for use with a yarn winding machine also having a slub detector at each station, said system further comprising:

a bad knot accumulator operatively connected to a plurality of said bad knot detectors for counting and indicating the total number of detected bad knots.

10. A process monitoring system as in claim 6 further comprising:

at least one rejected bobbin detector for detecting rejected bobbins still having a residue of yarn left thereon, and a rejected bobbin accumulator operatively connected to said rejected bobbin detector for counting and indicating the total number of detected reject bobbins still having a residue of yarn left thereon.

11. For use with a winder which transfers yarns wound on spinning bobbins to cones, a rejected bobbin count accumulator system, comprising:

a bobbin feeler mounted to contact rejected bobbins having residue yarn thereon;

a bobbin yarn switch linked to said bobbin feeler and normally in a first position and mounted to be actuated to a second position by rejected bobbins having residue yarn thereon, said switch returning to said first position after said bobbin having residue yarn thereon has passed said bobbin feeler;

a capacitor in circuit with said switch to be charged when said switch is moved to its second position; and a rejected bobbin counter in circuit with a power supply and said switch for being actuated by the discharge of said capacitor when said switch is returned to said first positions to register the passing of a rejected bobbin having residue yarn thereon by said bobbin feeler.

12. A rejected bobbin count accumulator system as in claim 11 further including:

a first resistor in circuit between said power supply and said switch;

a transistor in circuit between said counter and said capacitor;

a second resistor in circuit between a base electrode of said transistor and said switch; and a third resistor in circuit between said switch and said capacitor.

13. In combination with a winding machine having a winding station for winding continuous material, a device for connecting free ends of the material, a break detector and means for detecting faulty connections and a failure detector connected to the said means and for counting a predetermined number of successive faulty connections; a monitoring system comprising:

a condition detector associated with the break detector and the failure detector, and for producing a first output to indicate when either the break detector or the failure detector is actuated and a second output when neither the break detector nor the failure detector are actuated.

14. A monitoring system according to claim 13 and for a machine having a plurality of winding stations, each station having a break detector, means for detecting faulty connections and a failure detector for counting a predetermined number of successive faulty connections.

15. A monitoring system according to claim 13 for a winding machine wherein the continuous material is wound from a supply holder on to a receiving holder, the machine including at each winding station a quantity detector for sensing when the quantity of material wound on to the receiving holder has reached a predetermined value.

16. A system according to claim 15 wherein the quantity detector is also associated with the condition detector so that the condition detector produces a first output when the break detector, the quantity detector or the failure detector is activated and a second output when neither the break detector, the quantity detector nor the failure detector are activated.

17. A monitoring system in combination with a machine in which a continuous material is moved relative to a station which includes a detector for detecting a discontinuity in the continuous material, a device for connecting free ends of the continuous material, means for detecting faulty connections made between free ends of the material and a failure detector for counting the number of faulty connections, the monitoring system comprising:

a condition detector associated with the discontinuity detector and with the failure detector, the condition detector producing a first output when either the discontinuity detector or the failure detector is actuated.

18. A monitoring system according to claim 17 wherein the condition detector produces a second output when neither the break detector nor the failure detector is actuated.

19. A system according to claim 17 and for a machine having a plurality of stations each including a continuity detector, means for detecting faulty connections and a failure detector for counting the number of successive faulty connections.

20. In combination, a yarn winding machine comprising:

1. a plurality of bobbin-cone stations for winding yarn from a bobbin onto a cone, 2. an automatic knot tier for connecting loose ends of yarn, 3. a yarn break detector at each station for detecting a broken yarn condition thereat, 4. a bad knot detector at each station for detecting unacceptable knots produced by said automatic knot tier thereat, 5. a failure detector at each station connected to its associated bad knot detector for sensing a predetermined number of successive bad knots during operation of said automatic knot tier thereat which number is interpreted as a failure to cause subsequent bypassing of that station by the automatic knot tier until the reason for the failure has been corrected and the failure detector reset, 6. a full-cone sensor at each of said stations for sensing when the respectively associated cone if filled with yarn, 7. a condition detector means at each of said stations, which condition detector is connected to its respectively associated yarn break detector, full-cone sensor and failure detector for sensing the operating condition at each station by providing a first output condition to indicate station nonoperation when any one of said yarn break detector, said full-cone detector or said failure detector is then activated and a second output condition to indicate station operation when none of said yarn break detector, said full-cone detector or said failure detector have been activated, and 8. stationary electronic scanning means connected to a plurality of said stations for successively and repetitively interrogating the condition detector means respectively corresponding thereto for recording and accumulating the number of occurrences of at least one of the first and second output conditions instantaneously existing at each scanned station during any interrogation period, said stationary electronic scanning means including predetermined counter means for automatically stopping the interrogation of said plurality of stations after a predetermined number of station interrogations have occurred whereby a direct indication of efficiency is provided.

21. For use in combination with a winder and with a spindle electrical circuit associated therewith having three-phase electrical inputs, an electrical tension motor in circuit therewith, a first switch in circuit with said motor, an indicator in circuit with at least one of said inputs and a second switch in circuit with said indicator, a yarn-break accumulator system comprising:

rectifier means for connection in circuit with said first switch and for providing a rectified signal;
filter means in circuit with said rectifier means for providing a filtered DC voltage;
pulse forming means in circuit with said filter means for providing narrow output pulses of an extremely short duration;
first amplifier means in circuit with said pulse forming means for amplifying said output pulses;
first counter means in circuit with said amplifier means for counting the number of yarn breaks which occur; and
a first isolation diode in circuit between said pulse-forming means and said first amplifier means to permit actuation of more than one of said first switches when a plurality of said first switches are connected to said first amplifier means without adverse cross-coupling between said plurality of first switches.

22. For a winding machine having a plurality of winding stations for winding continuous material, a device for connecting free ends of the material, each station having a break detector, means for detecting faulty connections and a failure detector connected to the said means and for counting a predetermined number of successive faulty connections; a monitoring system comprising:

a condition detector associated with the break detector and the failure detector for producing a first output to indicate when the break detector or the failure detector is actuated and a second output when neither the break detector nor the failure detector are actuated, and
a scanning means for scanning the output of the condition detector associated with each winding station and for accumulating at least a measure of the number of condition detectors producing either of the said first and second outputs to automatically provide a direct indication of the operational efficiency of the said machine after completing a predetermined number of scanning cycles.

23. A monitoring system for a machine having a plurality of stations in which a continuous material is moved relative to a station, each station including a detector for detecting a discontinuity in the continuous material, a device for connecting free ends of the continuous material, means for detecting faulty connections made between free ends of the material and a failure detector for counting the number of faulty connections, the monitoring system comprising:

a condition detector associated with the discontinuity detector and with the failure detector of each station, the condition detector producing a first output when the discontinuity detector or the failure detector is actuated, and a second output when neither the break detector nor the failure detector is actuated, and
a scanning means for scanning the output of the condition detector associated with each station and for accumulating at least a measure of the number of condition detectors producing either of the said first and second outputs to automatically provide a direction indication of the operational efficiency of the said machine after completing a predetermined number of scanning cycles.

* * * * *